(12) United States Patent
Bakhtine (10) Patent No.: US 6,305,345 B1
(45) Date of Patent: Oct. 23, 2001

(54) HIGH-OUTPUT ROBUST ROTARY ENGINE WITH A SYMMETRICAL DRIVE AND IMPROVED COMBUSTION EFFICIENCY HAVING A LOW MANUFACTURING COST

(75) Inventor: Vladimir K. Bakhtine, Moscow (RU)

(73) Assignee: Igor V. Bakhtine, Moscow (RU)

( * ) Notice: Subject to any disclaimer, the term of this patent is extended or adjusted under 35 U.S.C. 154(b) by 0 days.

(21) Appl. No.: 09/523,774

(22) Filed: Mar. 11, 2000

(51) Int. Cl.$^7$ ............................................. F02B 53/00
(52) U.S. Cl. ............................ 123/245; 123/241; 418/36
(58) Field of Search ................................ 123/245, 210, 123/241; 418/36, 37

(56) References Cited

U.S. PATENT DOCUMENTS

| | | | |
|---|---|---|---|
| 3,144,007 | * | 8/1964 | Kauertz . |
| 3,937,187 | * | 2/1976 | Bergen ............................... 418/36 X |
| 4,068,985 | * | 1/1978 | Baer ...................................... 418/36 |
| 4,072,447 | * | 2/1978 | Gaspar ................................. 418/36 |
| 5,433,179 | * | 7/1995 | Wittry ................................. 123/245 |
| 5,622,149 | * | 4/1997 | Wittry ................................. 123/245 |
| 5,685,269 | * | 11/1997 | Wittry ................................. 123/245 |

* cited by examiner

Primary Examiner—Hoang Nguyen (74) Attorney, Agent, or Firm—Robert Nathans (57) ABSTRACT

An oscillatory scissor type rotary engine having two rotors wherein first and second rotor drive mechanisms are located on first and second opposite sides of the engine respectively, each rotor drive mechanisms including a carrier bowl that is rigidly fixed to an output shaft passing through the two hollow rotor drive shafts and mounted in bearings thus obviating the need for a separate drive mechanism support structure. By evenly spreading the load between all meshed gears through the provision of shock-absorbent members in the connecting rod heads, and of an increased number of symmetrically positioned planetary crank-and-pinion units on each side of the engine, and by evening out the impact loading through the use of drive components as flywheels, the resultant design is made simple, reliable, durable and dynamically balanced. The unique co-axial shaft arrangement ensuring precise rotor positioning enables elimination of conventional mechanical sealing and instead provides dynamic sealing of gases, to improve the durability of engine components. These dynamic gaps additionally accommodate heat-insulating coatings in the gaps between the housing and vanes and on the vanes themselves, which in turn result in reduced heat loads on major engine components, enabling the elimination of substantial housing cooling requirements. This advantage can permit housing/component cooling solely by means of circulating oil lubricant in cooling conduits in the housing and vanes, without the need for additional water cooling equipment, thereby to save manufacturing costs.

41 Claims, 5 Drawing Sheets

HIGH-OUTPUT ROBUST ROTARY ENGINE WITH A SYMMETRICAL DRIVE AND IMPROVED COMBUSTION EFFICIENCY HAVING A LOW MANUFACTURING COST

BACKGROUND OF THE INVENTION

The invention relates to the field of internal combustion rotary engines, and more specifically, to such engines of the oscillatory rotating type.

Engines as sources of mechanical force play a vital part in modern civilization. The most common type of engine today is an internal combustion engine based on a reciprocating piston arrangement and crank drive. The disadvantages of reciprocating engines are numerous and well known. They are heavy, of complex construction, use many moving parts, subject to relatively rapid wear, and utilize fuel at a very poor rate of efficiency. Also their emissions represent the largest constituent of urban atmospheric pollution worldwide. Today, more than ever before, all industries utilizing combustion engines are faced with restrictions as to the amount of pollutants exhausted by the engine. The engine-related noise and vibrations are also seen as significant health hazards that are long due for improvement.

Due to imminent fossil fuel shortages the industry is pressured to provide engines that are more fuel efficient. The consumers and user industries alike expect engines to become progressively lighter, smaller, more durable and reliable while at the same time they should also become simpler and cheaper to manufacture, operate and maintain.

The reciprocating engine has been with us for over a hundred years and during that time the design effort has been tremendous producing a multitude of improvements in all aspects of engine operation and performance. By now the reciprocating engine design has been developed to a near-perfect state with further improvement becoming ever more difficult and costly to achieve. Current efforts mainly center around the use of latest materials and fabrication techniques, sophisticated control systems and increasingly complex sub-systems such as variable electronic valve trains or direct fuel injection. While the continuing massive investments in related R & D keep producing diminishing returns in the form of ever costlier solutions the result is still short of the growing consumer expectations and in many cases the gap is widening. The obvious conclusion is that a break-through can only be achieved by a radical departure from the conventional reciprocating piston engine design.

For decades corporations and individual inventors all over the world have been coming up with designs of engines that would go a long way towards meeting the emerging requirements by achieving a more direct energy conversion without the use of a reciprocating piston. The type of arrangement that has shown the most promise is the so-called "rotary engine". A rotary engine is known as utilizing a rotor which is enclosed in a chamber and rotated by an expanding ignited gas to convert heat energy into mechanical energy in order to perform work. Some of the advantages thus achieved are as follows: higher volumetric output and power density due to multiple utilization of work space during one revolution; higher uniformity of torque due to multiple work strokes during one revolution; higher cumulative efficiency due to more effective phasing and lower loss to friction; simpler construction due to absence of a forced phasing mechanism and reduced vibration and noise due to lower numbers of poorly balanced parts.

The different arrangement, shape and motion of the rotor classify rotary engines into different types, the best known of which are at present the eccentric rotor type, movable vane type and oscillatory rotating engine.

The best known of the three is the eccentric rotor engine, more commonly known as "the Wankel engine". It is the only one to have achieved a limited commercial success. First built by a German engineer in mid-1950s it was at one time described as "revolutionary" and attracted a lot of development effort and funds. A number of automotive companies invested considerable resources in bringing Wankel-based products to market but all such projects bar one Mazda have since been aborted. Numerous patent applications have been filed and patents issued for this engine type e.g. U.S. Pat. No. 2,988,065 issued to Wankel et al. on Jun. 13, 1961, U.S. Pat. No. 3,174,466 issued to Scherenberg on Mar. 23, 1965, U.S. Pat. No. 3,483,849 issued to Yamamoto on Dec. 16, 1969, U.S. Pat. No. 3,667,311 issued to Louzecky on Jun. 03, 1975, U.S. Pat No. 4,308,002 issued to DiStefano on Dec. 29, 1981 and U.S. Pat. No. 5,203,307 issued to Burtis on Apr. 20, 1993.

The Wankel engine employs a generally triangular eccentrically rotating piston disposed within an elongate, generally oval chamber. The piston rotates within the chamber and alternatingly intakes a fuel mixture, compresses it, ignites it, and exhausts it, the same cycle as a reciprocating engine but with rotary motion. Mechanically this engine was a substantial simplification over the conventional reciprocating piston-type internal combustion engine because it greatly simplified phasing and because linearly reciprocating pistons, interconnected by complicated crankshafts, have been eliminated. However, the Wankel engine has caused serious concerns regarding pollution as in this type of engine, due to its inherent falcate shape of the chamber, poor combustion conditions prevail. Another effect of the poor combustion conditions is a high level of fuel consumption. Further, due to the complex shapes employed the Wankel engine is complex to manufacture and repair. Its seals are another problem area: even the most successful and known Wankel engine uses around twenty individually spring loaded sealing members working in a hard-to-machine epitrochoidal cavity where they are subjected to extreme wear and tear. Not surprisingly the engine's life span is generally somewhat limited.

Another variety of rotary engines is the so-called "sliding vane" type. In this type of arrangement use is made of a plurality of vanes mounted inside the rotor. The vanes slide in and out of the rotor to create separate energy chambers inside the engine. This type of engine is disclosed in a number of patents such as U.S. Pat. No. 4,401,070 issued to McCann on Aug. 30, 1983, U.S. Pat. No. 5,727,517 issued to Mallen on Mar. 17, 1998, U.S. Pat. No. 5,758,617 issued to Saito on Jun. 02, 1998 and U.S. Pat. No. 5,937,820 issue to Nagata on Aug. 17, 1999. This type of rotary engine has attracted some commercial interest e.g. the Rotary Engine being developed by Reg Technologies in Canada but the general design has inherent problems that are similar to those experienced in connection with the Wankel engine: sealing of the vane tips and wear-and-tear to which the rotor-mounted segments of the vanes are subjected. The design gets more and more complex as attempts are made to eliminate or alleviate these problems, such design complexities hardly conductive to reduced cost or extended life span of the engine.

An oscillatory rotating engine employs a plural number of rotors with interleaved vanes around the center of rotating. By changing the angular velocity of the rotors an oscillatory movement is superimposed on their uniform rotation, thus modifying the volume of the energy chambers defined by each pair of adjacent vanes and the inner surface of the engine housing. An inlet port, exhaust port and ignition device are provided at appropriate points on the housing, so that the expansion and contraction of the working chambers will provide induction, compression, expansion and exhaust strokes. The forces that alternately drive adjacent pistons apart or together are transformed through a motion transforming mechanism into forces that drive the output shaft.

The oscillatory rotating engines disclosed to date fall into two broad categories depending on the shape of the housing: cylindrical or toroidal. The toroidal arrangement presents greater manufacturing problems, requires more complex phasing and makes less efficient use of the space it occupies.

Regardless of the housing shape, oscillatory engines include a number of types depending on the drive mechanisms used to control the oscillatory motion of the rotors. The principle types of mechanism used for controlling this motion include ratchet stops, camming arrangements, elliptical gear arrangements or crank and planet gear arrangements.

Thus a type of ratchet mechanism is first disclosed in U.S. Pat. No. 1,003,80 issued to Rodigin in 1911 and in a number of more recent patents e.g. U.S. Pat. No. 4,279,577 issued to Appleton Jul. 21, 1981, U.S. Pat. No. 5,400,754 issued to Blanco Palacios et al. Mar. 28, 1995.

A variety of camming arrangements, first introduced by Tschudi in 1927, is more recently disclosed in a number of patents e.g. U.S. Pat. No. 4,035,111 issued to Cronnen in July 1977, U.S. Pat. No. 4,390,327 issued to Picavet on Jun. 23, 1983, U.S. Pat. No. 5,484,272 issued to Horn on Jan. 16, 1996.

A number of inventors have devoted their efforts to creating a drive mechanism for the oscillatory rotating engine based on the use of elliptical gears. Some of them are Way U.S. Pat. No. 3,112,062 of 1960, Sabet U.S. Pat. No. 3,203,405 of 1965, Groger U.S. Pat. No. 3,430,573 of 1966, Boes U.S. Pat. No. 3,873,247, Minka U.S. Pat. No. 4,010,716 of 1977, Seybold U.S. Pat. No. 4,057,374 of 1977, Sakita U.S. Pat. No. 5,133,317 of 1992 and Lopez U.S. Pat. No. 5,844,708 of 1998.

The main objection with the prior art drive/phasing mechanism designs as outlined above is that they employ arrangements that lack inherent robustness. In explosive engines of the rotary type it is the universal experience that it is difficult or impossible to so construct and arrange ratchets, cams or elliptical gears as to enable them to withstand the excessive shocks to which they are subjected by the sudden impulses imparted to the mechanism by the explosive character of the motive power. The shock loads in all of these arrangements are limiting their operation to slower speeds and shorter life and therefore they have not gained any wide acceptance.

The type of oscillatory rotating engine employing a drive mechanism based on the use of cranks and planet gears, is frequently referred to as the Kauertz engine after the inventor of one of its early embodiments; see U.S. Pat. No 3,144,007 of 1960. More recent examples of prior art include U.S. Pat. No. 3,937,187 issued to Bergen on Feb. 10, 1976, U.S. Pat. No. 4,068,985 issued to Baer on Jan 17, 1978, U.S. Pat. No. 4,072,447 issued to Gaspar on Feb. 07, 1978 and a number of U.S. patents issued to Wintry U.S. Pat. No. 5,433,179 on Jul. 18, 1995, U.S. Pat. No. 5,622,149 on Apr. 22, 1997, U.S. Pat. No. 5,686,269 on Nov. 11, 1997.

This type of drive is inherently more robust as it is based on the use of the crank technology that has been well proven and perfected over the decades of piston engine development. Wider acceptance and significant commercial use of this arrangement has however been prevented by a number of problems unresolved in prior art.

Despite its inherently more robust nature, this arrangement is also subject to heavy loadings of the drive mechanism packed into a limited space along with large variations of loads, a condition which is compounded by the limited space available on the single side of the engine housing where the mechanism has traditionally been located. Such loads have a particularly negative effect where they impact the meshed teeth of the planet pinions and single sun gear, e.g. as shown in Wittry U.S. Pat. Nos. 5,433,179, and 5,622,149. This leads to excessive strength requirements imposed on individual drive components, resultant output power constraints and difficulties in achieving mass production. The above drawbacks become particularly critical in trying to implement the Diesel cycle with its associated higher efficiency but much higher peak pressures and corresponding forces impacting the drive mechanism. Most prior art oscillatory engines are open to objections of this type.

SUMMARY OF PREFERRED EMBODIMENTS OF INVENTION

It is therefore a principal object of the present invention to provide a rotary internal combustion engine that will avoid the above problems while introducing a number of additional improvements that will become apparent. By combining the geometrical advantages of a rotary engine with the ruggedness associated with a piston engine the present invention is intended to ensure the degree of reliability and manufacturing simplicity necessary for effective mass production and utilization.

Another object of the present invention is to develop a rotary machine equally suitable for implementing either the Diesel or Otto cycle without any significant output constraints. Yet another objective is to develop a rotary engine in which fuel consumption and pollutant emission would be reduced to levels acceptable in a mass-produced engine.

Figure 1:
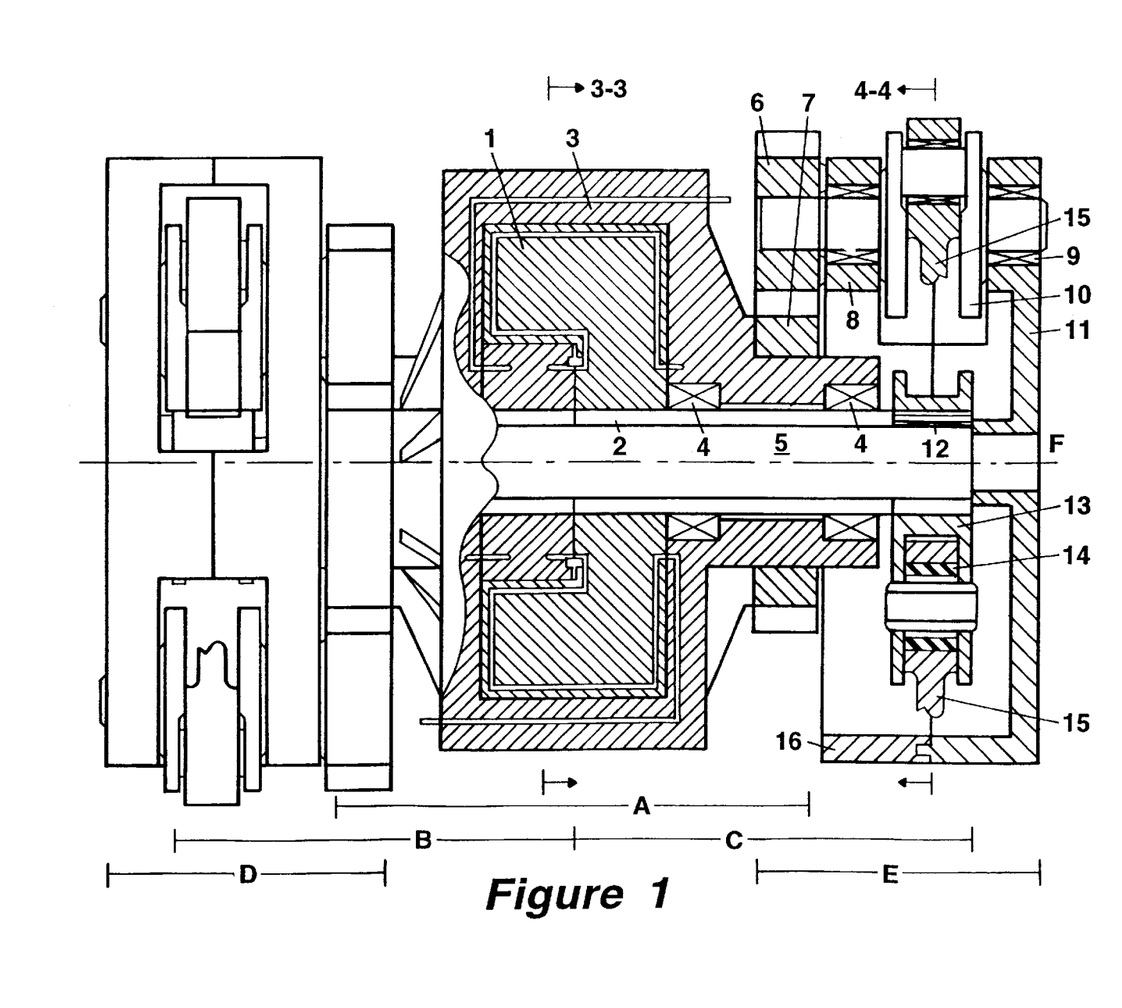
FIG. 1 is a sectional view of a preferred embodiment of the engine of the invention.

The present invention discloses an improved oscillatory rotating engine design employing a planetary crank-and-connecting rod drive mechanism incorporating a gear transmission. The device can be used as an internal or external combustion engine or as a compressor, pump or vacuum pump. As shown in FIG. 1, a single output shaft 5 is provided which passes through a pair of coaxial rotors 1a and 1b, each having two diametrically opposed vanes best shown in FIG. 3. The vane-carrying rotors freely rotate inside a cylindrical cavity provided within the engine housing 3 as they are driven by two independent drive mechanisms E and D (bottom of FIG. 1) positioned on the two sides of the housing and joined together by the output shaft 5 and F. The drive mechanisms are connected to the rotors via separate hollow rotor drive shafts 2 that are mounted in bearings 4 installed in the housing sides. The output shaft 5 passes coaxially through both hollow drive shafts 2, and is mounted in bearings 12 installed inside the drive shafts.

The rotor vanes are interleaved and overlap: together with the internal surfaces of the engine housing 3 they define four independent work chambers. The rotor drive mechanisms ensure unidirectional rotational movement of the rotors such that the vanes alternately speed up and slow down causing alternate synchronous expansion and contraction of the work chambers in pairs. Each rotation of the output shaft 5 causes two contraction and two expansion strokes per each of the work chambers. Each stroke is commenced and completed at a fixed angular position relative to the housing. Intake and exhaust ports provided in the requisite positions on the housing as well as fuel injection or spark plug facilities cause the Diesel or Otto thermodynamic cycles to be performed, respectively. See FIG. 3.

The number of satellite units may vary from two, the minimum number required to achieve a dynamically balanced assembly, to seven which is the maximum number that the sun gear can accommodate, and is chosen based on the specific strength requirements and other design considerations.

The drive mechanisms only convert the proportion of energy that is used to rotate the output shaft. The effort needed to compress the fuel and air mixture or just air as well as that needed to force out the exhaust gases is passed directly via the rotor vane material between the adjacent work chambers. The useful effort is transferred to the output shaft concurrently via both drive mechanisms during all work strokes as the cranks driving the vanes that are speeding up are at all times in a phase opposite to that of the cranks driving the vanes that are slowing down. In order to ensure an even distribution of load among the planetary pinions of each drive, the connecting rods are provided with shock-absorption means such as elastic rings built into their heads while the crank-and-pinion units are of such design as to have a considerable inertial mass and act as small flywheels thus further dampening any impact loads. The unique co-axial shaft arrangement in the engine enables elimination of conventional mechanical sealing by ensuring precise positioning of rotor edges relative to the inner housing cavity surface, and instead provides dynamic sealing of gases, to improve the durability of engine components, since rubbing of the vanes against the inner housing cavity surfaces is eliminated. These dynamic gaps additionally accommodate thermal barrier coatings in the gaps between the inner housing cavity working surfaces and the vanes. Due to the fact that the coatings are not subjected to friction, they can be made of any of a vast number of commercially available specialist ceramic or ceramic-based materials and can be applied by any of the existing standard techniques. The coatings are also deposited on the vanes themselves, and on the input and output port walls, which in turn result in reduced heat loads on major engine components, enabling the elimination of substantial housing cooling requirements. This advantage can permit housing/component cooling solely by means of circulating oil lubricant conduits in the housing and vanes, without the need for additional water cooling equipment, thereby to save manufacturing costs.

Figure 2:
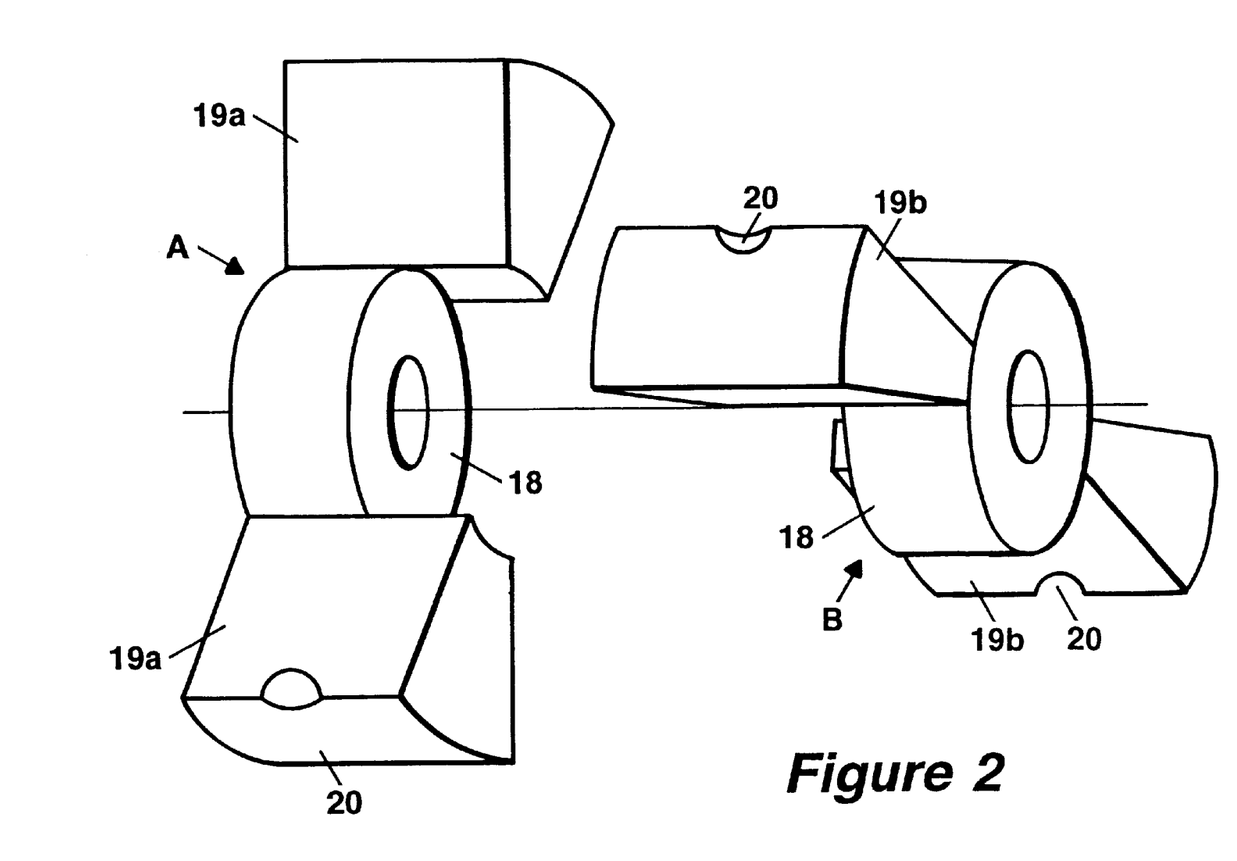
FIG. 2 is an exploded view of the rotor configuration.
Figure 3:
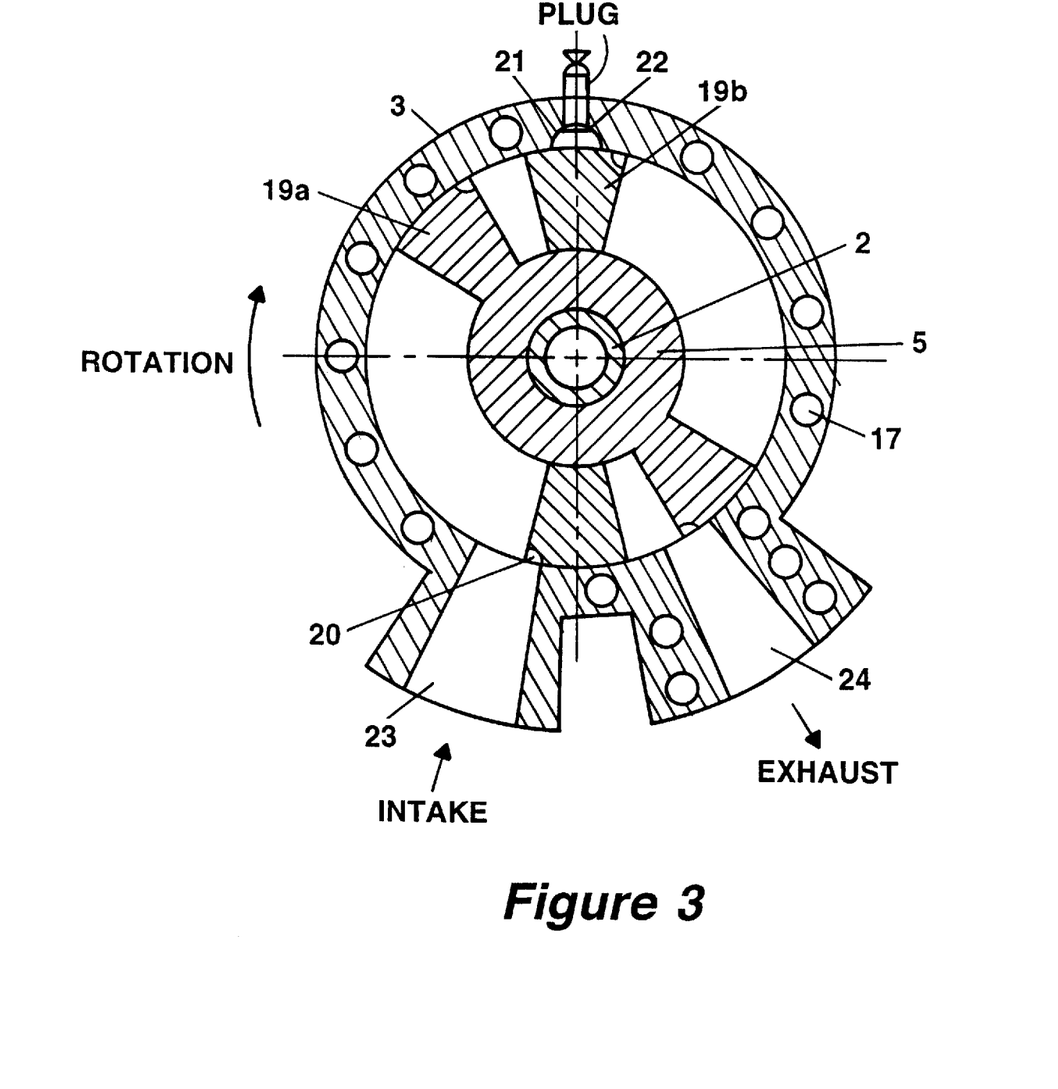
FIG. 3 is a cross-sectional view taken at the engine's center.

Also, cavities in the vane and housing surfaces are provided to form combustion chambers as shown in FIGS. 2 and 3, that improve the engine performance and simplify its construction. Combustion chamber definition by the flat surface of one vane, a cavity in the adjacent vane and a matching cavity in the housing around the fuel nozzle or spark plug optimizes combustion conditions and further minimizes heat losses to housing wall and rotor vane material. The offsetting of the combustion chamber relative to the plane of the vane joining ensures forced blending of the combustible mix during combustion thus improving combustion conditions and resulting in a more complete combustion.

BRIEF DESCRIPTION OF THE DRAWINGS

Other objects, features and advantages of the present invention will become more apparent upon study of the following detailed description, taken in conjunction with the drawings in which:

FIG. 4 is a cross-sectional view taken section A—of the connecting rod and crank;

section B—with the connecting rod removed;

section C—with the connecting rod and crank removed;

DETAILED DESCRIPTION OF PREFERRED EMBODIMENTS OF THE INVENTION

As already noted above, the present invention relates to oscillatory rotating internal combustion engines. The engine shown in FIG. 1 comprises a hollow cylindrical housing Group A accommodating two coaxial rotors Groups B and C. Two rotor drive mechanisms are provided Groups D and E, one on each side of the housing, each drive mechanism being rigidly connected to its own rotor. Connection between the two rotor drives is effected via the main shaft Group F which passes through the housing and rotors and acts as output shaft for the engine. The proposed arrangement sufficient to include a detailed description for one half of the overall arrangement only.

Each of the rotors, see FIG. 2, comprises a hub 18 and a pair of radial vanes 19a and 19b. A cavity 20 is provided at the top of each vane forming a compact combustion chamber together with the smooth surface of the other vane and the corresponding cavity 21 on the inner housing surface see FIG. 3. These cavities in the vane and housing surfaces are provided to form combustion chambers as shown in the drawings, that improve the engine performance and simplify its construction. Combustion chamber definition by the flat surface of one vane, a cavity in the adjacent vane and a matching cavity in the housing around the fuel nozzle or spark plug optimizes combustion conditions and further minimizes heat losses to housing wall and rotor vane material. The offsetting of the combustion chamber relative to the plane of the vane joining ensures forced blending of the combustible mix during combustion thus improving combustion conditions and resulting in a more complete combustion.

The rotors are coaxially inserted within one another with an angular shift so that their vanes are inter-digitized and the vane edges of each rotor overhang the hub of the other rotor as indicated in FIGS. 1–3.

In FIG. 1, a hollow drive shaft 2 is connected to each rotor 1, the drive shaft passing through the side wall of the housing 3, wherein it is mounted in anti-friction bearings 4. An output shaft 5 coaxially passes through the rotors 1 and the hollow drive shafts 2 wherein it is mounted in bearings 12. FIG. 3 shows a cross sectional view of the engine taken along the rotor cross section 3—3 the figure also shows an intake 23 and exhaust 24 ports and an ignition plug 22 which is replaced with a fuel injection means in a diesel engine.

Figure 4:
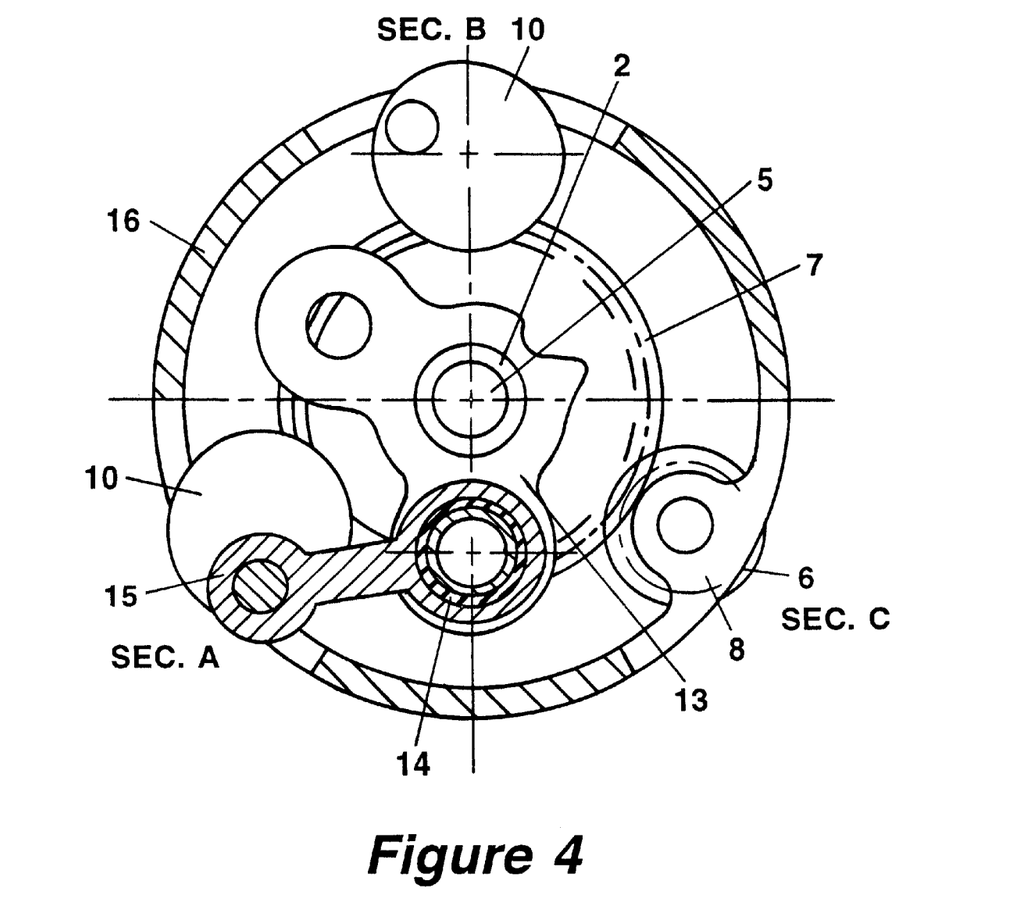

The output shaft 5 is freely rotatable in bearings 12 relative to the rotors 1 and drive shafts 2 but is rigidly connected on both sides to the drive mechanism carrier bowls 11. Each of the drive mechanisms incorporates two to seven planetary units that are placed symmetrically relative to the output shaft 5. FIG. 4 shows a cross section view of the drive mechanism taken along 4—4 a drive mechanism incorporating three planetary units is shown as illustration only. Three views are shown as follows:

A) A cross section view of the crank and connecting rod

B) A crank with the connecting rod and one side plate removed

C) A crank seat with the crank removed only pinion 6 in place.

Each planetary unit includes a crank 10 featuring two side plates with the half-axles of the said crank being mounted in bearings 9 at both ends. One bearing 9 is fixed to the wall of the carrier bowl or cup 11, while the other bearing 9 is mounted in the extension of the connection ring 16 which is rigidly attached to the carrier cup 11. The half-axle of the crank 10 closest to the housing 3 is rigidly connected to the planet pinion 6 which rolls around the stationary sun gear 7 which is twice the diameter of the pinion 6 and is rigidly fixed to extensions of the engine housing wall 3. The crank 10 is connected to a lever coupling unit 13 by a connecting rod 15. One end of the connecting rod 15 accommodates a pin extending from the crank 10 while its other end is attached to a socket on the coupling unit 13 via a shock-absorption element such as an elastic ring 14 which reduces the shock impact caused by fuel ignition during each work stroke. Each of the lever coupling units 13 is rigidly fixed to the respective drive shaft 2 and through the latter is linked to the respective rotor 1. As mentioned above the other half of the engine is mirror symmetrical with its phasing angularly shifted by 90 degrees as indicated in FIG. 2.

The engine housing 3 and rotors 1 are permeated by a labyrinth of channels 17 through which a cooling fluid is forced by an external pump not shown in drawings. All the work surfaces i.e. the vanes, inner housing surfaces, intake and exhaust ports, are covered with a ceramic or ceramic-based thermal barrier coating which causes the engine to operate under lighter thermal conditions than are common in conventional engines. This makes it possible to use ordinary motor oil as the cooling fluid. The natural leakage of oil at the points of movable channel 17 junctions ensures adequate lubrication of the surfaces that are in frictional contact such as the rotor hubs 18 and housing 3. In order to ensure lubrication of the drive mechanisms a proportion of oil is diverted into the clearance between the output shaft 5 and the drive shafts 2 and then sprayed under the carrier bowl 11. The resultant oil mist is contained by light covers not shown attached to the housing.

There is no need for lubricating the work surfaces of the rotor vanes 19 or adjacent surfaces of the housing 3 as the engine design makes use of labyrinthine dynamic sealing of gases not shown in drawings. The elimination of conventional mechanical sealing is made possible by the fact that the movement of the rotors 1 relative to the housing 3 is defined by the bearings 4 of the drive shafts 2 and excludes any friction. The existence of a minimal constant clearance only modified by heat-induced deformations together with a significant length of the insulating surfaces at least $\frac{1}{16}^{th}$ of the outer circle of the rotor ensures minimal leaking of the working mixture during the compression cycle even in the Diesel version. The absence of direct friction improves the durability of both the engine components such as housing and rotor vanes as well as their thermal-barrier coatings.

The collection, cooling and pumping of oil is effected by an external system which incorporates no novel features and is not therefore shown in the drawings. Likewise the preparation of fuel and air mix and imparting of ignition pulses for spark ignition engines or fuel injection for Diesel engines as well as other supplementary functions are performed by external systems of conventional design that are not shown in the drawings.

The engine makes use of intake 23 and exhaust 24 ports that are positioned on the housing to open and close at fixed points thus ensuring effective charging and scavenging of work chambers with minimum pumping losses as compared with the valve systems of conventional engines. The system is extremely simple and includes no additional moving parts. The uniformity of exhaust achieved by using one direct port also creates good prerequisites for the use of a turbo-charger in order to raise the average cycle pressure in the Diesel version.

While the engine is running the uniform rotation of the main shaft 5 is converted by the drive mechanism to unidirectional rotation of the rotors 1 with their alternate speeding up and slowing down. This arrangement of an oscillatory rotating engine is known in the art as a scissor-action or cat-and-mouse type. One revolution of the main shaft 5 causes in each of the four chambers defined by the adjacent pair of rotor 1 vanes 19 and inner surface of the housing 3, the four cycles to occur in a rigid relation to the angular position relative to the engine housing 3.

During the first cycle the chamber expands from minimum to maximum volume while passing the intake port 23. During the second cycle the chamber contracts to its minimum volume which is the volume of the cavity 20 provided in the surface of the vane 18 speeding up to catch up with the one slowing down, together with the cavity 21 provided in the housing wall and positioned next to the ignition plug or fuel injector 22. Ignition or fuel injection, as appropriate occurs towards the end of the compression cycle. At this time the rotor vanes continue to close forcing the remainder of air or fuel mix into the combustion chamber which takes an asymmetrical drop-like shape. The swirling caused by the flat surface of the slowing-down vane and by the stationary surface of the housing cause fuel and air to mix thoroughly thus ensuring efficient and complete combustion.

The high pressure of the burnt gases acts on the rotor 1 surfaces causing the work chamber to expand to its maximum volume. During the third cycle the work performed by the expanding gases is partly imparted via the rotor bodies to the other work chambers forcing two of them to contract and one to expand, and partly transferred via the drive shafts and drive mechanisms to the output shaft 5 in order to perform useful work. During the forth cycle the exhaust gases are forced out of the exhaust port 24 by the contraction of the work chamber to its minimum volume. Then the cycle is repeated.

In designing engines of the proposed arrangement the internal diameter and length of the housing are determined on the basis of the desired displacement and the ratios between the vane height and length as well as between the vane length and hub radius. The ratio between the drive and output shaft diameters is determined within the hub diameter based on the strength requirements. The dimensions of the drive components are determined on the basis of their individual strength requirements together with the geometrical ratios between the cranks, connecting rods, coupling unit, planet pinions and sun gear. An important design parameter is the vane root angle shown as 45° in the drawings and the relative rotor oscillation angle which determine the rotor strength, displacement and compression ratios. Further mathematical modeling of the gas dynamic processes or prototype testing will be required in order to determine the optimized shape and geometry of the rotor blade and housing cavities as well as the best material, layer thickness and application technique for the thermal barrier coating.

The specific engineering designs for all principle components such as housing parts, shafts, rotors and so forth are determined by strength considerations as well as design simplicity goals. In a smaller engine, for example, the coupling unit may be linked to the connecting rod cantilever style and the same arrangement one half-axle only may be used for linking the crank to the carrier bowl etc.

Whatever arrangement is chosen, the drives in this type of rotary engine must comply with such geometrical ratios between the connecting rod length and the crank and coupling radius that would ensure the requisite relative oscillatory movement of the vanes while achieving the strength specifications desired. In prior art this dilemma has either been overlooked or resolved empirically. We shall resolve this by constructing a geometrical model of the mechanism. In order to simplify our calculation we shall apply the super-positioning principle by transferring our coordinate grid from the fixed housing to the uniformly rotating drive carrier bowl see FIG. 5. Thus our coordinate origin zero point will correspond to the rotational axis of the output shaft 5. The distance from the rotational center of the crank-and-pinion planetary unit A point to zero point is three times the pitch radius of the planet pinion that we designate as "a" as the pitch radius of the sun gear is twice as big as a. If, starting from zero point, we plot an arc of circle BC with radius R equal to the arm of the central coupling lug and an angle equal to the vane oscillation angle $\phi$ so that a continuation of chord BC passes through point A, and then plot a circle from point A with a radius equal to the distance from the crank axle to the center of its pin that we shall designate as "r" to intersect with a continuation of chord BC at points E and F, we will have produced a closed geometrical model for the ideal drive as BE shall be equal to CF and shall be equal to the connecting rod length L. On the one hand, this will ensure equality of the oscillation angles as points E and F are separated by 180 degrees of crank turn which is necessary in order to ensure that identical conditions prevail in all the four work chambers. On the other hand, nearly ideal conditions are thus obtained for the transfer of force from the crank to the coupling unit as the force transmission from the crank will always occur at an angle of close to 90 degrees.

Figure 5:
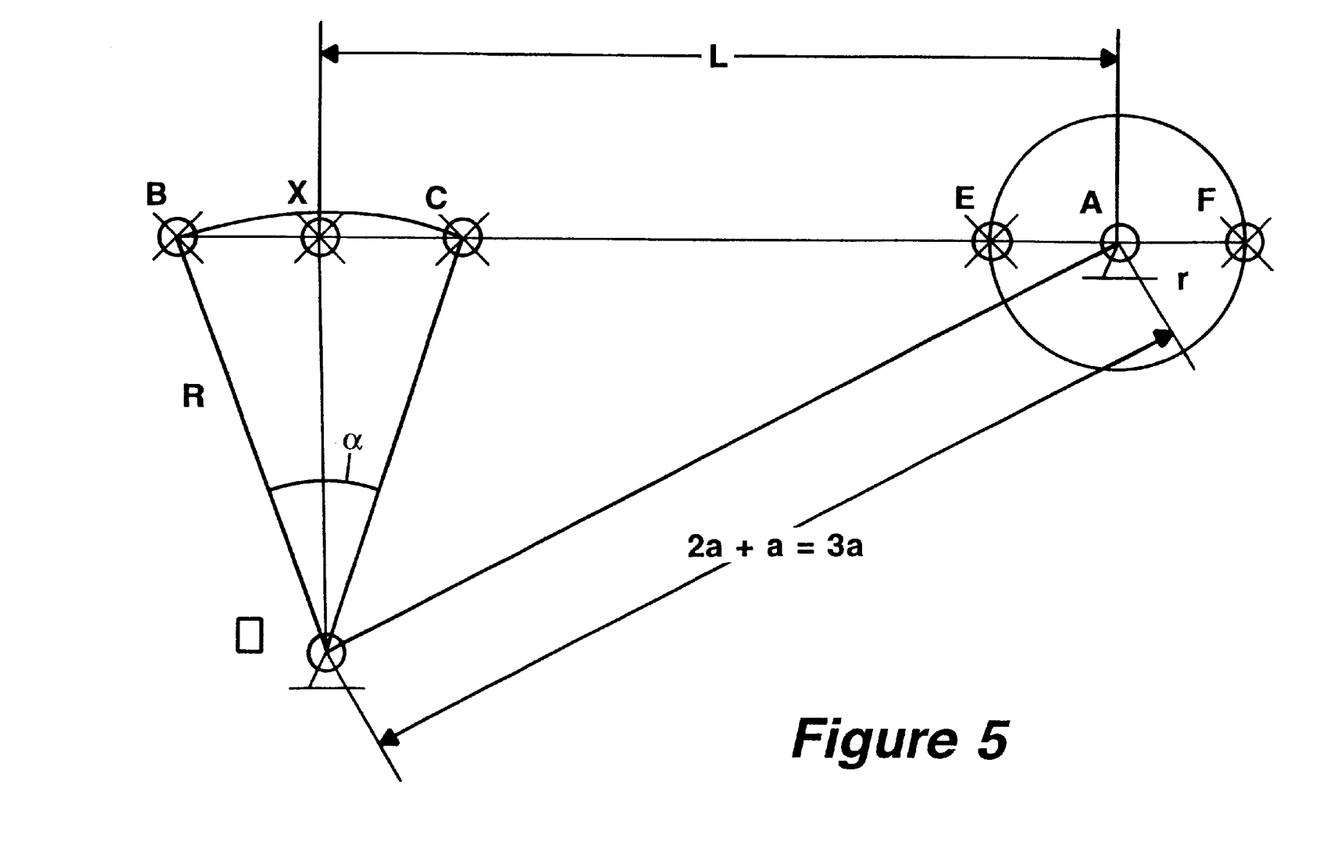
FIG. 5 is a plot of the drive geometry.

In order to determine the dependent dimensions we will now plot height OX from zero point to chord BC. Angles BOX and COX will equal half of angle $\phi$. Triangles BOX, COX, OAX will be rectangular and will all share a common side OX. It is worth noting that as BC equals EF and equals L, AX also equals L i.e. the length of the connecting rod.

By going through some simple geometrical calculations we will obtain as follows:

$$L2=9*a2-R2*\cos 2\phi/2$$

The sizes of the planet and sun gears may vary depending on strength requirements and other engineering design considerations with the only proviso that the pitch diameter of the sun gear is always twice that of the planet gears. The main size of the central coupling R shall also depend on the strength requirements and other design considerations. The main size of the crank is determined by the required oscillation angle and R: $r=R * \sin \phi/2$. The last calculation to be made is that for the connecting rod length L as per the above formula *.

The drive mechanism design specifics and sizes will vary depending on the specific implementation and its associated strength requirements displacement, cycle, desired output to weight ratio etc. The choice of a particular design variant is in each case a trade-off between, on the one hand, the machine weight and dimensions and, on the other hand, its reliability and durability. The use of more advanced materials available today, such as high alloys and alloys of titanium etc., will enable high reliability to be achieved while keeping the size of the drive mechanism small.

My novel design of an oscillating rotary piston engine is capable of supporting both the Diesel and Otto cycles and demonstrates a number of advantages as compared with prior art designs, that can be summarized as follows:

a) Increased maximum output capacity b) Improved reliability and durability of the drive and the whole engine c) Improved efficiency and fuel economy d) Simplified design, simpler and cheaper manufacture and maintenance The above advantages are achieved by implementing the following improvements as compared with prior art:

A. Mechanical Improvements:

Use of a separate drive mechanism located on its own side of the main housing for each of the two rotors, to make the design mirror symmetrical and provide more space for accommodating each of the drives.

Attaching both drives to the same shaft which is the main output shaft and which passes through the drive shafts and hubs of both rotors, to eliminate the need for additional external mounting structures that would have to be coaxial.

Placement of the fixed sun gear inside the drive mechanism which is affixing directly to the main housing, to eliminate the need for additional external mounting structures that would have to be rigidly affixed to the main housing.

Use of two fixed sun gears to distribute the impact loading between a number of impact points (four to fourteen), to make the structure more robust and improve engine durability.

Increased number of planetary crank-and-pinion units from two to three to seven per drive, the exact number is chosen depending on the strength requirements and other design considerations, to reduce the loading per each unit and improve the engine reliability and durability.

Elimination of cantilevered parts in the crank-and-pinion and central coupling units, to improve their robustness.

Increased inertial mass of the planetary cranks, to improve the uniformity of rotation and dampen the impact loads on the gears at the time of ignition during each work stroke.

Dual use of the inertial mass of the planetary mechanisms in rotation both about their own axis and that of the engine as a whole, to improve the uniformity of rotation of the output shaft and to reduce the need for a flywheel mass.

Use of shock absorbing elements in the connecting rod heads, to even out the loading of individual planetary units and reduce explosive impact on the meshed gear teeth.

Improved Gas Dynamics:

Combustion chamber definition by the flat surface of one vane, a cavity in the adjacent vane and a matching cavity in the housing around the fuel nozzle or spark plug, to optimize combustion conditions and minimize heat losses to housing wall and rotor vane material.

Offsetting the chamber mentioned above relative to the plane of the vane joining, to provide forced blending of the combustible mix during combustion thus improving combustion conditions and ensuring a more complete combustion.

Use of dynamic sealing of gases, by eliminating mechanical friction between major components while ensuring minimum design clearances between the same, to reduce friction losses, enable effective use of thermal barrier coatings and significantly improve overall engine durability.

Additional Improvements:

Use of thermal barrier coatings on the work chamber surfaces and exhaust port, to reduce heat flows into the constructional materials in order to reduce heat loads on the construction elements and heat losses during the cycle.

Use of a combined cooling and forced lubrication system by using oil as heat carrier, to simplify the engine design and eliminate the second work body coolant.

Use of oil for forced cooling of both housing walls and rotor blades by employing a network of special internal channels connected to an oil pumping and cooling system, to reduce the operating temperatures in individual structural elements in order to improve their strength parameters and reduce heat-induced deformations.

An important point of novelty of this disclosure, in addition to combining the above features in a unique way, is in providing separate crank-and-connecting rod drives on the two sides of the engine and distributing the impact loads among a bigger number of planetary units thus causing a significant improvement in reliability and durability by comparison with prior art. This improvement is further enhanced by the novel use of shock-absorption elements in the connecting rod heads.

Another major step forward is the move to a dynamic seal which enables an effective use of thermal insulation coatings that in conjunction with an optimized combustion chamber shape cause a significant reduction in the heat loads to which major individual components are subjected. This in turn enables the use of lubricating oil as the cooling agent resulting in a considerable simplification of the cooling and lubrication system.

Yet another significant improvement is the use of rotor drive shafts as the carrying base for the drive mechanisms achieved by mounting the output shaft bearings inside the rotor drive shafts. This arrangement helps to achieve a significant simplification of the housing design and ensures guaranteed coaxiality of the drive mechanisms, drive shafts and rotors on both sides of the engine as well as precise positioning of the rotor edges relative to the inner surface of the housing cavity.

Since variations of the foregoing description of a preferred embodiment of the invention will occur to those skilled in the art, the scope of the invention is to be restricted solely by the terms of the following claims and art recognized equivalents thereof. For example, it will be appreciated by those skilled in the art that this invention has applications not only for engines, but also for pumps and compressors, even though an engine has been described in detail herein. While the oscillatory rotary engine will normally have four working chambers, it is conceivable that another type of rotary engine, which can utilize the invention, may have a different number of chambers. It is also conceivable that the drive mechanism carrier could have a shape other than a bowl shape, although the latter is greatly preferred.

What is claimed is:

1. An improved oscillatory rotating piston engine, comprising:
    (a) a housing including a cylindrical cavity having inlet and outlet ports and ignition or fuel injection means therein;
    (b) first and second rotor means having vanes thereon positioned within said cavity and dividing the said cavity into four individual work chambers;
    (c) first and second rotor drive mechanisms, coupled to said first and second rotor means respectively, for producing complex variable unidirectional rotor movement, resulting in expansion and contraction of said work chambers;
    (d) a main output shaft for extracting power from said engine, co-axially passing through said rotors and rotor drives; and
    (e) mounting means for affixing said first rotor drive mechanism to said main output shaft at a first portion thereof to the right of said housing cavity and for affixing said second rotor drive mechanism to said main output shaft at a second portion thereof, widely separated from said first portion, and to the left of said housing cavity.

2. The engine of claim 1 wherein said first and second rotor drive mechanisms are rigidly affixed to first and second rotor means via first and second hollow rotor drive shafts respectively, said first and second hollow rotor drive shafts encompassing and being freely rotatable about said main output shaft.

3. The engine of claim 1 wherein each rotor drive mechanism comprises two to seven planet-crank units positioned around said main output shaft within a carrier bowl which is rigidly affixed to said output shaft eliminating the need for separate mounting structures.

4. The engine of claim 2 wherein each rotor drive mechanism comprises two to seven planet-crank units positioned around said main output shaft within a carrier bowl which is rigidly affixed to said output shaft eliminating the need for separate mounting structures.

5. The engine of claim 1 wherein each rotor drive mechanism includes a plurality of planetary gears meshing with a fixed sun gear, and wherein said fixed sun gear is placed within said drive mechanism and affixed upon said housing eliminating the need for separate mounting structures.

6. The engine of claim 2 wherein each rotor drive mechanism includes a plurality of planetary gears meshing with a fixed sun gear, and wherein said fixed sun gear is placed within said drive mechanism and affixed upon said housing eliminating the need for separate mounting structures.

7. The engine of claim 3 wherein each rotor drive mechanism includes a plurality of planetary gears meshing with a fixed sun gear, and wherein said fixed sun gear is placed within said drive mechanism and affixed upon said housing eliminating the need for separate mounting structures.

8. The engine of claim 4 wherein each rotor drive mechanism includes a plurality of planetary gears meshing with a fixed sun gear, and wherein said fixed sun gear is placed within said drive mechanism and affixed upon said housing eliminating the need for separate mounting structures.

9. The engine of claim 3 wherein each planet-crank unit includes a rotary crank disk means having sufficient mass to act as a small flywheel.

10. The engine of claim 4 wherein each planet-crank unit includes a rotary crank disk means having sufficient mass to act as a small flywheel.

11. The engine of claim 5 wherein each planet-crank unit includes a rotary crank disk means having sufficient mass to act as a small flywheel.

12. The engine of claim 6 wherein each planet-crank unit includes a rotary crank disk means having sufficient mass to act as a small flywheel.

13. The engine of claim 7 wherein each planet-crank unit includes a rotary crank disk means having sufficient mass to act as a small flywheel.

14. The engine of claim 3 wherein each planet-crank unit includes a connecting rod head having a shock absorbing element positioned therein.

15. The engine of claim 4 wherein each planet-crank unit includes a connecting rod head having a shock absorbing element positioned therein.

16. The engine of claim 9 wherein each planet-crank unit includes a connecting rod head having a shock absorbing element positioned therein.

17. An improved oscillatory rotating piston engine, comprising:
  (a) a housing including a cylindrical cavity having inlet and outlet ports and ignition or fuel injection means therein;
  (b) first and second rotor means having vanes thereon positioned within said cavity and dividing the said cavity into four individual work chambers;
  (c) first and second like rotor drive mechanisms, coupled to said first and second rotor means respectively, for producing complex variable unidirectional rotor movement, resulting in expansion and contraction of said work chambers;
  (d) a main output shaft for extracting power from said engine, co-axially passing through said rotors and rotor drives; and
  (e) mounting means for affixing said first rotor drive mechanism to said main output shaft at a first portion thereof, and for affixing said second rotor drive mechanism to said main output shaft at a second portion thereof.

18. The engine of claim 17 wherein said first and second rotor drive mechanisms are affixed to first and second rotor means via first and second hollow rotor drive shafts respectively, said first and second rotor drive shafts surrounding, and being freely rotatable about, said main output shaft.

19. The engine of claim 17 wherein each rotor drive mechanism comprises two to seven planet-crank units positioned around said main output shaft within a carrier bowl which is rigidly affixed to said output shaft eliminating the need for separate mounting structures.

20. The engine of claim 18 wherein each rotor drive mechanism comprises two to seven planet-crank units positioned around said main output shaft within a carrier bowl which is rigidly affixed to said output shaft eliminating the need for separate mounting structures.

21. The engine of claim 17 wherein each rotor drive mechanism includes a plurality of planetary gears meshing with a fixed sun gear, and wherein said fixed sun gear is placed within said drive mechanism and affixed upon said housing eliminating the need for separate mounting structures.

22. The engine of claim 18 wherein each rotor drive mechanism includes a plurality of planetary gears meshing with a fixed sun gear, and wherein said fixed sun gear is placed within said drive mechanism and affixed upon said housing eliminating the need for separate mounting structures.

23. The engine of claim 19 wherein each rotor drive mechanism includes a plurality of planetary gears meshing with a fixed sun gear, and wherein said fixed sun gear is placed within said drive mechanism and affixed upon said housing eliminating the need for separate mounting structures.

24. The engine of claim 20 wherein each rotor drive mechanism includes a plurality of planetary gears meshing with a fixed sun gear, and wherein said fixed sun gear is placed within said drive mechanism and affixed upon said housing eliminating the need for separate mounting structures.

25. The engine of claim 17 wherein each planet-crank unit includes a rotary crank disk means having sufficient mass to act as a small flywheel.

26. The engine of claim 18 wherein each planet-crank unit includes a rotary crank disk means having sufficient mass to act as a small flywheel.

27. The engine of claim 17 wherein each planet-crank unit includes a connecting rod head having a shock absorbing element positioned therein.

28. The engine of claim 18 wherein each planet-crank unit includes a connecting rod head having a shock absorbing element positioned therein.

29. The engine of claim 19 wherein each planet-crank unit includes a connecting rod head having a shock absorbing element positioned therein.

30. An improved oscillatory rotating piston engine, comprising:
  (a) a housing including a cylindrical cavity having inlet and outlet ports and ignition or fuel injection means therein;
  (b) first and second rotor means having vanes thereon positioned within said cavity and dividing the said cavity into four individual work chambers;
  (c) first and second planetary rotor drive mechanisms having substantially the same components, said rotor drive mechanisms being coupled to said first and second rotor means respectively, for producing complex variable unidirectional rotor movement, resulting in expansion and contraction of rotor work chambers within said housing, each rotor drive mechanism comprising two to seven planet-crank units for providing dual use of the inertial mass of said planetary rotor drive mechanisms, in rotation, both about their own axis, and that of the engine as a whole, for thus improving uniformity of rotation of said output shaft, and
  (d) an output shaft for extracting power from first and second rotor means within said housing of said oscillatory rotating piston engine.

31. The engine of claim 30 wherein each rotor drive mechanism includes a sun gear affixed to said engine housing.

32. The engine of claim 1 wherein each rotor drive mechanism comprises at least three planet-crank units positioned around said main output shaft.

33. The engine of claim 17 wherein each rotor drive mechanism comprises at least three planet-crank units positioned around said main output shaft.

34. The engine of claim 30 wherein each rotor drive mechanism comprises at least three planet-crank units positioned around said main output shaft.

35. The engine of claim 1 further including thermal heat-insulating coatings provided upon inner wall portions of said cylindrical cavity and on said vanes, enabling cooling solely by means of circulating lubricant through cooling conduits in the housing and vanes, to save manufacturing costs and improve efficiency.

36. The engine of claim 17 further including thermal heat-insulating coatings provided upon inner wall portions of said cylindrical cavity and on said vanes, enabling cooling solely by means of circulating lubricant through cooling conduits in the housing and vanes, to save manufacturing costs and improve efficiency.

37. The engine of claim 30 further including thermal heat-insulating coatings provided upon inner wall portions of said cylindrical cavity and on said vanes, enabling cooling solely by means of circulating lubricant through cooling conduits in the housing and vanes, to save manufacturing costs and improve efficiency.

38. The engine of claim 1 wherein cavities are formed in the housing and vanes to provide asymmetric combustion chambers that are offset from the vane-closing plane, in order to improve combustion and engine performance.

39. The engine of claim 17 wherein cavities are formed in the housing and vanes to provide asymmetric combustion chambers that are offset from the vane-closing plane, in order to improve combustion and engine performance.

40. The engine of claim 30 wherein cavities are formed in the housing and vanes to provide asymmetric combustion chambers that are offset from the vane-closing plane, in order to improve combustion and engine performance.

41. The engine of claim 37 wherein cavities are formed in the housing and vanes to provide asymmetric combustion chambers that are offset from the vane-closing plane, in order to improve combustion and engine performance.

* * * * *